May 28, 1968  J. AMES ET AL  3,385,959

FLEXIBLE HEATING ELEMENTS

Filed May 26, 1965  2 Sheets-Sheet 1

INVENTORS
JACK AMES
ROBERT PATTON

BY
ATTORNEYS

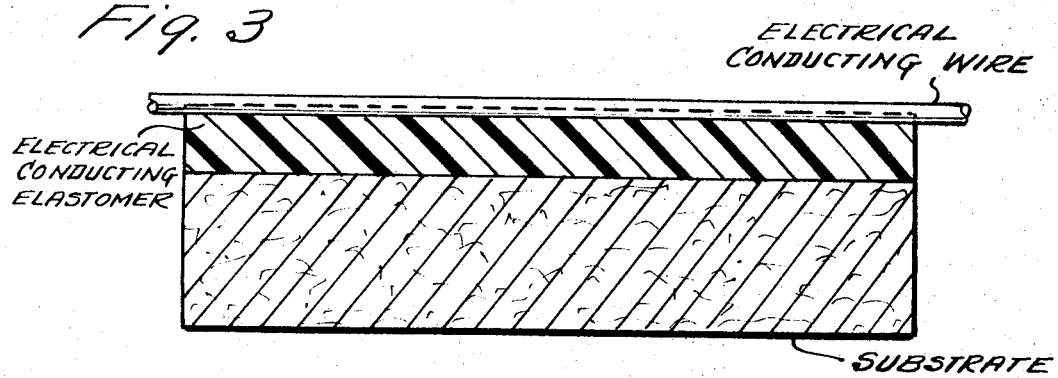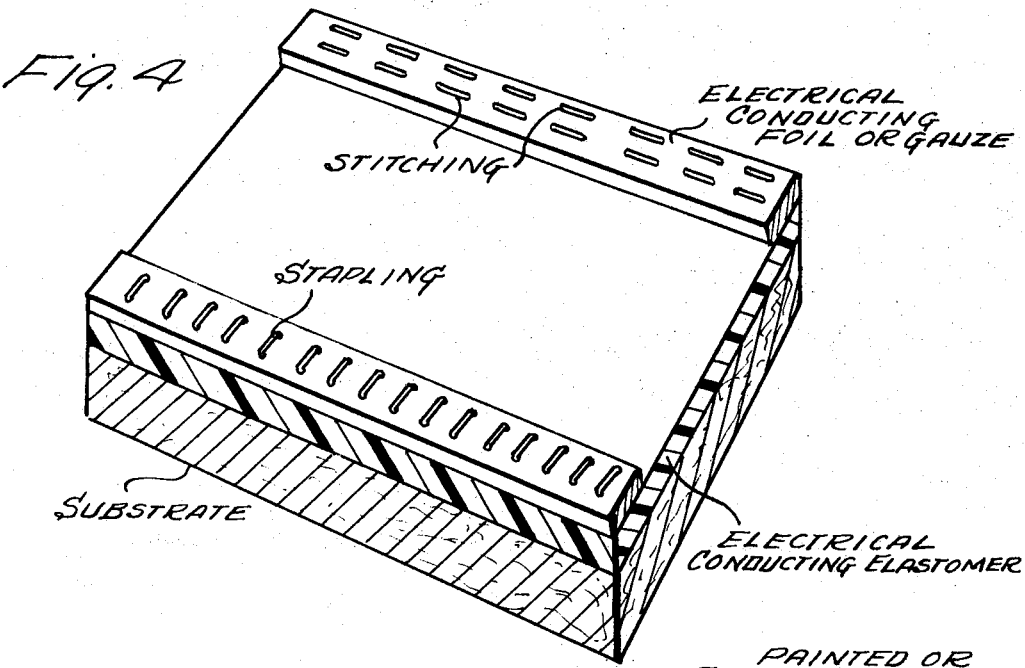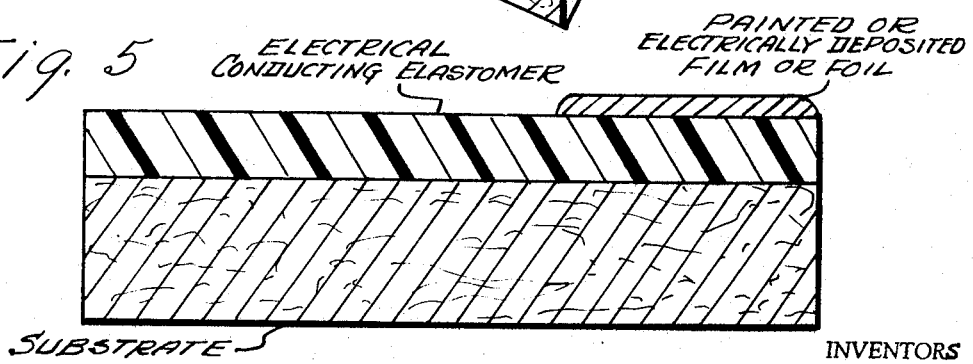

United States Patent Office 3,385,959
Patented May 28, 1968

3,385,959
FLEXIBLE HEATING ELEMENTS
Jack Ames, Barassie, and Robert Patton, Saltcoats, Scotland, assignors to Imperial Chemical Industries Limited, Millbank, England, a corporation of Great Britain
Filed May 26, 1965, Ser. No. 459,017
Claims priority, application Great Britain, May 29, 1964, 22,307/64
9 Claims. (Cl. 219—549)

ABSTRACT OF THE DISCLOSURE

There is provided a flexible heating element suitable for wall or ceiling heating panels or heating jackets for vessels which is formed of a non-woven, non-knitted web substrate having coated thereon an electrically conducting elastomeric material comprising an organopolysiloxane gum, carbon black and fillers, additives and catalysts. The non-woven, non-knitted web substrate with the above-mentioned compositions coated thereon provide a structure with uniform electrical properties in all directions which is flexible, tough and resistant to cracking.

---

Figure 1:
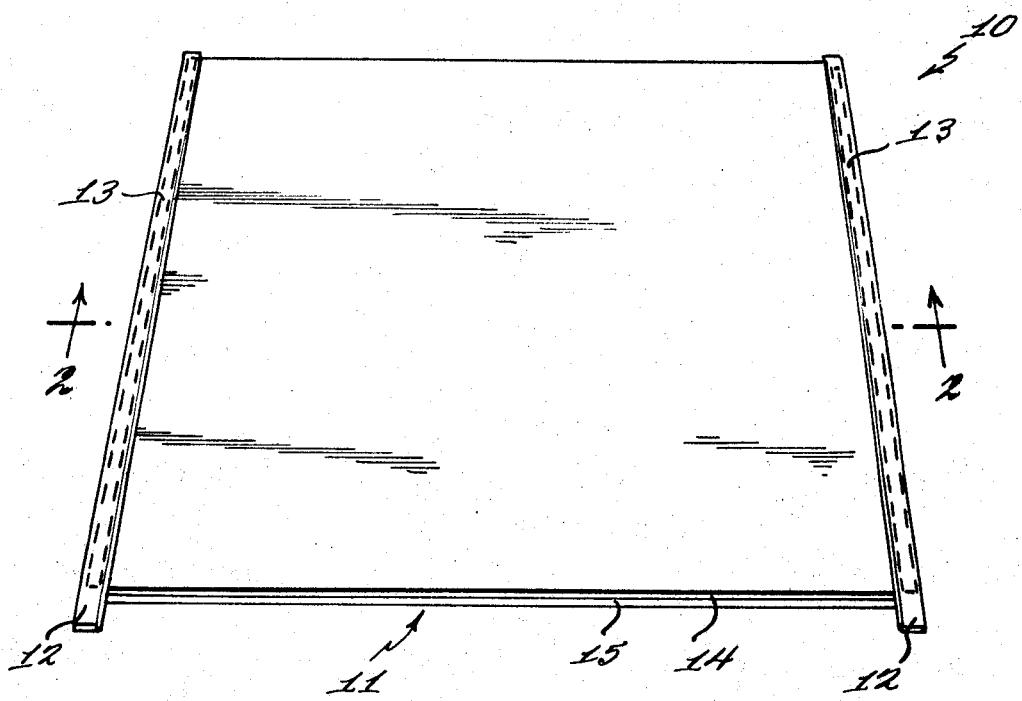

This invention relates to new and useful flexible heating elements.

A wide variety of flexible heating elements have been used or proposed for use in sundry applications such as, for example, domestic and industrial heating in the form of electric blankets or panels for domestic use and jackets for vessels for industrial use. In such uses heating has been achieved by, for example, the passage of an electric current through a resistance wire or through an electrically conducting elastomer such as a natural rubber or an organopolysiloxane elastomer. Where an elastomer has been used it has normally been coated on a woven fabric.

According to the present invention a new and useful flexible heating element comprises an electrically conducting organopolysiloxane elastomer coated on a non-woven, non-knitted web substrate.

A wide variety of electrically conducting organopolysiloxane elastomers may be used in the heating elements of our invention. The compositions used to produce the elastomers may be of the kind convertible to an elastomer by the action of an organic peroxide at elevated temperatures and may comprise, for example, 100 parts by weight of an organopolysiloxane gum, a small proportion of the organo groups attached to silicon therein being unsaturated groups such as vinyl or allyl groups, 25 to 100 parts by weight of a suitable carbon black, 0 to 50 parts by weight of one or more other fillers, 0 to 10 parts by weight of a structure control agent and 0.25 to 10 parts by weight of an organic peroxide curing agent such as dicumyl peroxide with or without other modifiers or additives. Alternatively, the compositions may be of the kind convertible to elastomers at ambient temperatures, for example, by the action of a triacyloxy-silane on a hydroxylated organopolysiloxane and may comprise, for example, 100 parts by weight of a hydroxy-ended organopolysiloxane gum, 25 to 100 parts by weight of a suitable carbon black, 0 to 50 parts by weight of one or more other fillers and 0.5 to 25 parts by weight of an organotriacyloxysilane with or without other modifiers or additives. The compositions may alternatively be of the kind in which an organopolysiloxane gum containing unsaturated groups such as vinyl groups is converted to an elastomer by the action of a platinum catalyst. These may comprise, for example, 100 parts by weight of an organopolysiloxane gum having at least two unsaturated groups per molecule, 0.1 to 100 parts of an organosilicon compound having at least two hydrogen atoms directly bonded to a silicon atom per molecule, 25 to 100 parts by weight of a carbon black, 0 to 50 parts by weight of one or more other fillers, 0 to 10 parts by weight of a structure control additive and up to 0.2 part by weight (as platinum) of platinum metal or a platinum containing catalyst with or without other modifiers or additives. The electrical conductivity of these elastomers is, of course, achieved by there being incorporated therein a suitable proportion of an appropriate type of carbon black. The actual conductivity of the element will, of course, depend on the nature and amount of the carbon black.

The non-woven, non-kitted web substrate may be a felted material or a film material and may be of a wide variety of materials, for example, asbestos paper, cellulose-based paper such as manila paper, polyethyleneterephthalate paper, polypropylene paper, polyethyleneterephthalate film, polypropylene film and like materials.

The organopolysiloxane elastomer-forming composition may be applied to the substrate by a dipping, knife-coating, calendering or spraying operation, a solvent being incorporated if necessary in order to give the desired, or required, consistency for the particular operation. It may, of course, also be applied by any other conventional coating technique. The applied coating is then cured to an elastomer in the manner appropriate to the particular composition in use. It is in many cases preferred that the elastomer composition be applied by spraying since by this method a more close control of the resistivity of the ultimate heating element can be achieved. The thickness of the elastomer coating may vary widely, for example, from 0.0005 to 0.01 inch. It is, however, in general preferred that it be from 0.001 to 0.004 inch.

If necessary or desirable, for example, to avoid penetration of water into the substrate the rearward side thereof may be coated with a suitable material. This may be, for example, the electrically conducting elastomer or some other material, for example, such as a water repellent organopolysiloxane.

The necessary electric power for heating is normally fed to our heating elements by electrodes, for example, of metal wire. These may be attached by any convenient means such as by stapling or stitching. Alternatively, strips of metal gauze or foil may be used. A film or foil deposited directly on the substrate, for example, electrolytically or by painting may also be used.

The heating elements of our invention may be used for a wide variety of applications. These include, for example, as wall or ceiling heating panels or as heating jackets for vessels.

Our invention is further illustrated by the following

Example 1

An electrically conducting organopolysiloxane elastomer-forming composition was prepared by mixing together 100 parts of a methylvinylpolysiloxane having 0.1 mol percent methylvinylsiloxanyl units and 99.9 mol percent dimethylsiloxanyl units and of average molecular weight 750,000, 50 parts of an acetylene black of average particle size 42 m$\mu$ and surface area 65 m.$^2$/g., 2 parts of (tetramethylethylenedioxy)dimethylsilane and 10 parts of a mixture containing 40 percent dicumyl peroxide and 60 percent calcium carbonate.

20 parts of the so obtained composition were dispersed in 80 parts of toluene. A sheet of manila paper 0.005 inch thick was dip-coated with this dispersion to a total thickness of 0.0065 inch after which it was air dried. The dried sheet was heated in a press at 150° C. for 15 minutes. Two brass gauze electrodes 6″ long and 0.5″ wide were stapled to opposite edges of a 6″ square of the coated paper. The resistance between the electrodes was found to be 400 ohms. When a 50 volt A.C. power source was connected across the electrodes the power dissipated in the element was 6 watts and the temperature of the element rose to 45° C.

Example 2

An electrically conducting organopolysiloxane composition was made by mixing together 100 parts of a methylvinylpolysiloxane of average molecular weight $5 \times 10^5$ and having 0.23 mol percent methylvinylsiloxanyl units and 99.77 mol percent dimethylsiloxanyl groups, 65 parts of a carbon black of average particle size 42 m$\mu$ and surface area 65 m.$^2$/g. (Shawinigan acetylene black) and 5 parts of a linear methylhydrogenpolysiloxane of average molecular weight 2,000 and having a ratio of methyl groups to silicon atoms of 1.12:1. This composition was dispersed in 300 parts of toluene and 0.002 part of platinum in the form of a solution of 0.45 part of dichlorobis(diethylsulphide) platinum II in 100 parts of benzene added thereto.

A piece of manila paper 2 feet long, 1 foot wide and 0.004 inch thick was dip-coated with the so obtained dispersion to a total thickness of 0.007 inch. The coating was then cured to an elastomer by heating for 15 minutes in an air circulating oven at a temperature of 150° C. Brass gauze electrodes 12″ long and 0.5″ wide were then stapled to the short sides of the coated paper. The resistance between the electrodes was found to be 350 ohms. When a 150 volt A.C. power source was connected across the electrodes the power dissipated in the element was 60 watts and its temperature rose to 60° C.

Example 3

The organopolysiloxane composition of Example 2 was dispersed in toluene as described therein and knife-coated on to a roll of paper consisting of nylon fibres ("Nomex" Paper as sold by E. I. du Pont de Nemours). The coating was then cured to an elastomer by heating for 15 minutes in an air circulating oven at a temperature of 150° C.

A heating element was made by sewing two copper foil electrodes ½ inch wide across a 12″ wide strip of the paper, and 12″ apart. When a 50 volt A.C. power source was connected across the copper electrodes, the power dissipated in the element was 10 watts, and the temperature of the element rose to 34° C.

Similar elements having the same electrical properties were made using as the substrate various papers consisting of polyethylene terephthalate fibres (Grades 5110 and TST7 as sold by Lantor Ltd.) and papers consisting of viscose fibres (Types 5600 and 5107 as sold by Lantor Ltd.).

Similarly an element was made using as substrate a polyethyleneterephthalate film ("Melinex"). This also had the same electrical properties.

Figure 2:
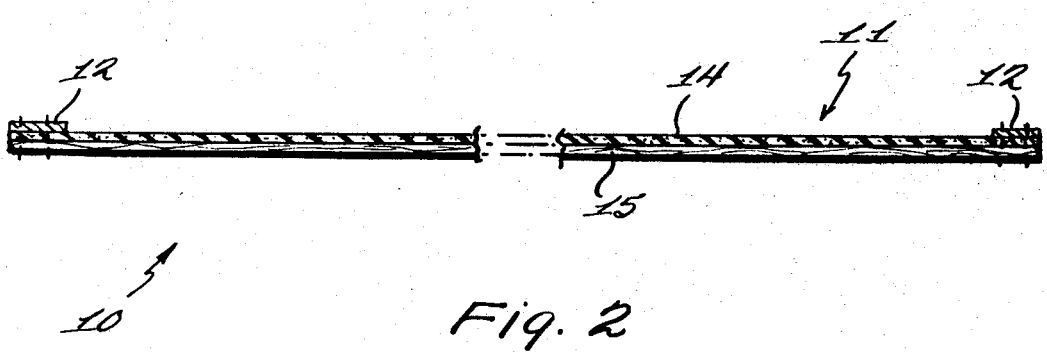

The invention is further illustrated by the drawing, in which:

FIGURE 1 is a perspective view of the flexible heating element of the present invention, and FIGURE 2 is a sectional elevation view along lines 2—2 in FIGURE 1.

FIGURES 3 through 5 illustrate various methods of attaching electrodes to the conducting elastomer, In FIGURE 1, the flexible heating element 10 of the present invention is generally shown. This element is composed of a flexible conducting sheet 11, and two metal electrodes 12 stapled or otherwise fixed to the opposite edges of the flexible conducting sheet 11. The stapled portions of the electrodes 12 are indicated as portions 13. The flexible conducting sheet 11 is composed of two layers: on the top there is a layer of an electrically conducting organopolysiloxane elastomer 14, coated on a non-woven, non-knitted web substrate 15.

An enlarged sectional view of the flexible heating element is shown in FIGURE 2.

Various methods of attaching electrodes are illustrated in FIGURES 3–5 and appropriately labeled. FIGURE 3 shows the use of a wire electrode, FIGURE 4 shows the use of foil or gauze electrodes stapled or stitched onto the conducting elastomer and FIGURE 5 shows a painted on electrolytically deposited film or foil.

What we claim is:

1. A flexible heating element comprising an electrically conducting organopolysiloxane elastomer selected from the group consisting of:
   (a) elastomers formed by heating a composition comprising 100 parts by weight of an organopolysiloxane gum having therein a small proportion of vinyl or allyl groups attached to silicon atoms, 25 to 100 parts by weight of a carbon black and 0.25 to 10 parts by weight of an organic peroxide curing agent,
   (b) elastomers formed by curing a composition comprising 100 parts by weight of a hydroxy-ended organopolysiloxane gum, 25 to 100 parts by weight of a carbon black, and 0.5 to 25 parts by weight of an organotriacyloxysilane, and
   (c) elastomers formed by curing a composition comprising 100 parts of an organopolysiloxane gum having at least two unsaturated groups per molecule, 0.1 to 100 parts by weight of an organosilicon compound having at least two hydrogen atoms directly bonded to a silicon atom per molecule, 25 to 100 parts by weight of carbon black, and up to 0.2 part by weight, as platinum, platinum metal or a platinum-containing catalyst, coated to a thickness of 0.0005 to 0.01 inch on a non-woven, non-knitted web substrate selected from the group consisting of asbestos paper, cellulose-base paper, polyethylene terephthalate paper, polypropylene paper, polyethylene terephthalate film and polypropylene film and means attached to said coated elastomer for electrically connecting said coated elastomer to an electrical source.

2. An element according to claim 1 wherein the thickness of the coating is from 0.001 to 0.004 inch.

3. An element according to claim 1 which is provided with electrodes of metal wire.

4. An element according to claim 1 which is provided with electrodes of metal gauze.

5. An element according to claim 1 which is provided with electrodes of metal foil.

6. An element according to claim 1 wherein the electrodes are stapled to the element.

7. An element according to claim 1 wherein the electrodes are stitched to the element.

8. An element according to claim 1 provided with electrodes of a metal film which has been electrolytically deposited on the substrate.

9. An element according to claim 1 provided with electrodes of a metal film which has been painted in the substrate.

References Cited

UNITED STATES PATENTS

| | | | |
|---|---|---|---|
| 1,872,581 | 8/1932 | Haroldson | 338—212 X |
| 2,277,772 | 3/1942 | Marick | 219—211 |
| 2,314,766 | 3/1943 | Bull et al. | 219—213 |
| 2,473,183 | 6/1949 | Watson | 338—212 X |
| 2,559,077 | 7/1951 | Johnson et al. | 219—528 X |
| 2,575,987 | 11/1951 | York et al. | 219—549 X |
| 2,641,675 | 6/1953 | Hannahs. | |
| 2,777,930 | 1/1957 | Nathanson | 219—543 |
| 2,997,568 | 8/1961 | Leipold et al. | 219—213 |
| 3,002,862 | 10/1961 | Smith-Johannsen | 117—226 |
| 3,056,750 | 10/1962 | Pass | 252—511 |
| 2,683,673 | 7/1954 | Silversher | 338—211 X |
| 2,781,277 | 2/1957 | Dwyer | 338—203 X |
| 2,961,522 | 11/1960 | Hammer | 219—549 |
| 3,060,303 | 10/1962 | Skoglund et al. | 338—211 |
| 3,287,684 | 11/1966 | Armbruster. | |

FOREIGN PATENTS 1,006,809   7/1964   Great Britain.

BERNARD A. GILHEANY, *Primary Examiner.*

VOLODYMR Y. MAYEWSKY, *Examiner.*